United States Patent [19]

Lindquist

[11] Patent Number: 5,157,888
[45] Date of Patent: Oct. 27, 1992

[54] STORAGE VAULT AND METHOD FOR MANUFACTURE

[75] Inventor: Thomas R. Lindquist, Denair, Calif.

[73] Assignee: Convault, Inc., Denair, Calif.

[21] Appl. No.: 793,219

[22] Filed: Nov. 7, 1991

Related U.S. Application Data

[63] Continuation of Ser. No. 614,689, Nov. 15, 1990, abandoned, which is a continuation-in-part of Ser. No. 936,205, Dec. 1, 1986.

[51] Int. Cl.$^5$ .......................... E04B 1/16; B28B 1/08
[52] U.S. Cl. .......................... 52/741; 264/71
[58] Field of Search ............... 184/106; 52/264–268, 52/168, 169.5, 169.6, 169.7, 192, 245, 249, 741; 220/571; 206/524.5; 405/270, 271, 303; 264/32, 71

[56] References Cited

U.S. PATENT DOCUMENTS

| | | | |
|---|---|---|---|
| 886,481 | 5/1909 | Daniel | 52/564 |
| 1,219,786 | 3/1917 | Splater | 52/143 |
| 1,476,421 | 12/1923 | Rowland | 220/DIG. 5 |
| 1,483,341 | 2/1924 | Fitch | 52/124.2 |
| 1,540,563 | 6/1925 | Oliver | 206/524.5 |
| 1,630,639 | 5/1927 | Taylor | 184/106 |
| 1,983,355 | 12/1934 | Escher | 52/234 |
| 2,083,491 | 3/1936 | Chaffee | 52/249 |
| 2,136,390 | 6/1938 | McHugh | 52/612 |
| 2,544,828 | 5/1947 | Dobell | 52/224 |
| 3,130,520 | 4/1964 | Newman | 52/138 |
| 3,340,115 | 9/1967 | Rubenstein | 52/DIG. 7 |
| 3,439,461 | 4/1969 | Chandler et al. | 52/612 |
| 3,545,213 | 8/1970 | Sebor et al. | 52/263 |
| 3,562,977 | 2/1971 | Alleaume | 52/249 |
| 3,822,520 | 7/1974 | Crom, Jr. | 52/224 |
| 3,848,765 | 11/1974 | Durkop | 220/18 |
| 4,183,221 | 7/1987 | Yamamoto | 52/249 |
| 4,271,647 | 2/1985 | Balck, Jr. | 52/169.4 |
| 4,366,654 | 1/1983 | Bomhard | 52/249 |
| 4,387,491 | 6/1983 | Schaaf et al. | 52/140 |
| 4,513,550 | 4/1985 | Kotcharian | 52/249 |
| 4,552,166 | 11/1985 | Chadbourne et al. | 220/426 |
| 4,682,911 | 7/1987 | Moreland | 405/270 |
| 4,960,222 | 10/1990 | Fields | 220/571 |

Primary Examiner—James L. Ridgill, Jr.
Attorney, Agent, or Firm—Townsend and Townsend

[57] ABSTRACT

A dual containment, free-standing, earthquake resistant, above-ground, flammable liquid storage vault is made by first pouring a reinforced concrete outer tank having a flat bottom, for stability, and side walls. The inner surface of the concrete outer tank is covered with an epoxy resin, the epoxy resin acting as an outer liquid barrier to provide secondary containment. A layer of gravel is placed on the epoxy resin covering the bottom of the outer tank. A primary containment steel inner tank is then placed in the outer tank with a space between the walls of the inner and outer tanks. That space is then filled with concrete when a concrete cap is poured covering the inner tank. Leaks from the inner tank are monitored at the gravel layer. The concrete outer tank has integrally formed skids extending from its lower surface for ease of movement and for visual inspection beneath the vault for leaks. The vault can also be made by placing the inner tank within a free-standing, open-top shell; the combination is then encased in reinforced concrete.

7 Claims, 3 Drawing Sheets

FIG. I.

STORAGE VAULT AND METHOD FOR MANUFACTURE

This is a continuation of application Ser. No. 07/614,689, filed Nov. 15, 1990, now abandoned.

BACKGROUND OF THE INVENTION

There is a continuing interest in the safe containment of liquids particularly gasoline and other fuels because of the vast amount of fuel presently stored throughout the country. It has become increasingly apparent that underground storage tanks can and do leak thus causing serious short-term and long-term problems. Therefore, many localities have chosen to examine all underground tanks, mostly fuel storage tanks, to determine if the tanks are leaking. It is an expensive process to inspect the tanks and test the earth surrounding the tanks for indications of leakage. Repair or replacement of tanks which are shown to be leaking increases the cost a great deal further.

To aid the detection and prevention of leaks, double wall (dual containment) tanks have been used for both underground and above ground storage. The space between the two walls of the tanks is monitored for leakage. When used underground, monitors can be used to sense both water seepage in and stored liquid seepage out. If a leak is detected, the tank can be drained and abandoned, dug up and removed, or repaired in place. These options are all quite expensive. If the contaminated soil surrounding the leaking tank must be removed, the expense increases dramatically. However, conventional double wall tanks are quite expensive and are not presently able to meet fire code standards for aboveground storage of flammable liquids. Therefore, even when dual containment tanks are used, flammable liquid is most often stored in below-ground tanks.

SUMMARY OF THE INVENTION

The present invention is directed to a transportable, earthquake-resistant storage vault suitable for storing flammable liquid above ground while providing dual containment and the ability to monitor leakage through the primary (inner) containment vessel.

According to one embodiment of the invention, the dual containment, above-ground storage vault is made by first making a concrete outer tank having a bottom and side walls. An outer liquid barrier is positioned within the outer tank. Preferably the outer liquid barrier is created by covering the inner surface of the concrete outer tank with any epoxy resin. The epoxy resin acts as a secondary containment vessel. A liquid/vapor collection region, which can be created by a layer of gravel, is placed over the epoxy resin covering the bottom of the outer tank.

A substantially sealed inner tank, which acts as the primary containment vessel, is then placed in the outer tank over the gravel layer. The inner tank is sized so that there is a space between it and the epoxy covered inner walls of the outer tank. If sufficiently wide, this space is filled with concrete, preferably while a concrete cap is poured over the top of the inner tank.

The secondary containment vessel can be created in ways other than by the use of an epoxy resin. For example, a flexible membrane shaped to conform to the inside surface of the concrete outer tank could be used. Also, the epoxy resin can be replaced by a rigid, open-top secondary containment vessel within which the inner, primary containment vessel is situated. The inner tank could be supported a short distance above the bottom of the outer containment vessel by spacers. This would eliminate the need for a gravel layer. Using a rigid secondary containment vessel permits the concrete to be poured in a single step to envelope both the primary and the secondary containment vessels. Concrete may flow into the region between the two rigid vessels, depending upon the space between the two.

When the storage vault is used for storage of fuels, appropriate fill, pump and vent pipes, each with its own cap, extend upwardly from the inner tank, through the concrete cap and to positions above the concrete cap to allow access to the interior of the inner tank. Also, to allow the liquid/vapor collection region to be monitored for leaks (primarily for leaks from the inner tank). a leak detector pipe can be positioned between the inner tank and the epoxy layer prior to pouring the concrete. Conventional sensing apparatus is used to monitor for leakage.

The concrete outer tank preferably has integrally formed supports or skids extending from its lower surface. The skids not only allow the storage vault to be moved using forklifts, they allow the storage vault to be visually monitored for leaks. To aid such monitoring, the ground surface on which the storage vault is placed can be covered with a sheet of plastic or other material which would allow simple visual leak checks to be made.

The invention is transportable and can be used above ground to store flammable liquids this allows the storage vault to be especially suited for temporary use at construction sites. The costs associated with burying tanks underground are also eliminated with the present invention.

If desired, multiple storage vaults can be used and connected in parallel or in series according to the use requirements. Also, two or more inner tanks can be placed within a single outer tank.

The use of reinforced concrete as the outer tank acts provides several advantages. The concrete provides a protective physical barrier for the inner tank, to protect the inner tank from physical damage, at a reasonable cost. The concrete outer tank also serves as an effective thermal barrier. By using an Underwriters Laboratories approved inner tank and the reinforced concrete outer tank, an above-ground storage vault suitable for use with flammable liquids is achieved.

Preferably the storage vault has a flat bottom. Unlike many prior art storage containers, which are spherical or cylindrical and must be supported on a stand, the invention needs no separate support stand. The invention is extremely stable and thus is quite resistant to damage from earthquakes.

With the present invention a flammable liquid can be stored safely above ground. This removes the tank from local regulations and codes dealing with monitoring below-ground storage tanks. The present invention still permits the user to effectively monitor for leaks before any contamination to the surrounding earth occurs. The ability to monitor the region between the primary and secondary containment vessels and the ability to position the storage vault on skids so that the region beneath the outer tank can be visually inspected provides a double measure of protection against damage to the environment.

Other features and advantages of the invention will appear from the following description in which the preferred embodiments have been set forth in detail in conjunction with the accompanied drawings.

DETAILED DESCRIPTION OF THE PREFERRED EMBODIMENTS

Figure 1:
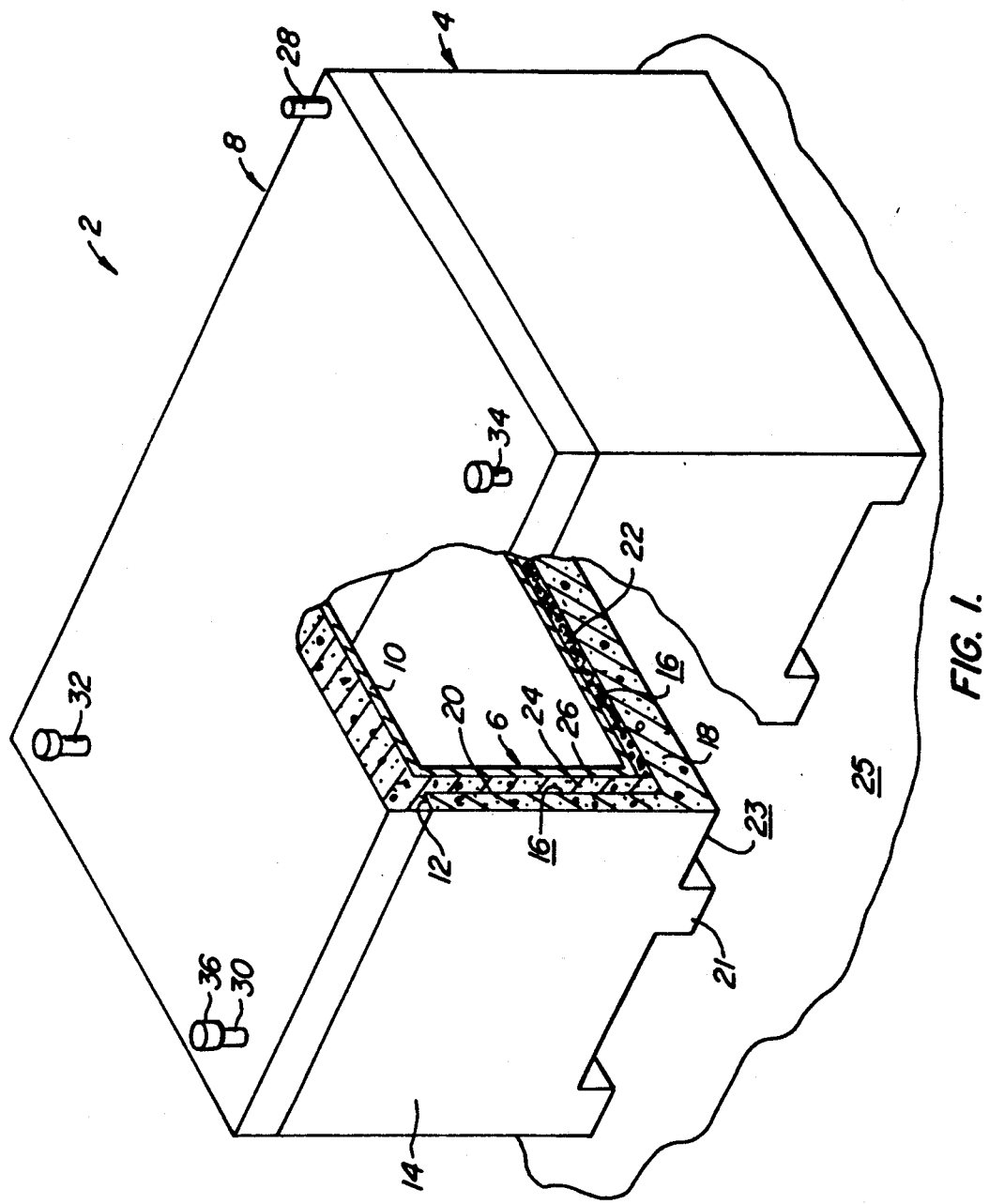
FIG. 1 is an isometric view of a storage vault made in accordance with the invention with portions broken away to show the internal construction.

Referring now to FIG. 1 a storage vault 2 is shown to include a reinforced concrete outer tank 4, a steel inner tank 6 housed within outer tank 4, and a concrete cap 8. Cap 8 covers the top 10 of inner tank and the upper, circumferential edge 12 of the side wall 14 of outer tank 4.

Outer tank 4 has an inner surface 16 along its side wall 14 and bottom 18. Surface 16 is covered by a liquid impervious epoxy coating 20. Inner tank 6 acts as the primary containment vessel while coating 20 acts as an outer liquid barrier or secondary containment vessel. The portion of epoxy coating 20 covering bottom 18 is covered with a layer of pea gravel 22, which acts as a liquid/vapor collection layer between epoxy coating 20 and inner tank 6. Skids 21, formed as integral parts of outer tank 4, extend from lower surface 23 of bottom 18 to support vault 2 above ground 25.

A concrete layer 24 lies between epoxy coating 20 covering side wall 14 and the sides 26 of inner tank 6. Preferably, concrete layer 24 and concrete cap 8 are formed in a single operation to create an integral member as discussed below.

A leak detector pipe 28 extends from pea gravel 22, between epoxy coating 20 and inner tank 6 and to a position above cap 8. Pipe 28 allows the user to test for liquid or vapor within liquid/vapor collection layer 22 through the use of conventional sensors and techniques. Inner tank 6 is, in the preferred embodiment, designed for use as a gasoline storage vault, and includes a fill pipe 30, a pump pipe 32 and a vent pipe 34. Pipes 28, 30, 32 and 34 are sealable with conventional caps 36.

In one preferred embodiment, six inches of reinforced concrete surrounds a 500-gallon steel inner tank 6. If desired lightweight concrete can be used to reduce the weight of vault 2 and thus make it easier to transport. In addition, the two-hour fire protection, which requires a six-inch layer of regular concrete, can be achieved with only four inches of lightweight concrete. This further reduces the weight of storage vault 2, thus making the storage vault patent that much more transportable.

The preferred embodiment of vault 2 is rectangular and has a flat bottom 18. The flat bottom makes storage vault 2 very stable and thus quite earth-quake-resistant. The rectangular shape allows storage vaults 2 to be placed side-by-side for maximization of storage density. In addition, by the appropriate placement and sizing of skids 21 and the detector, fill, pump and vent pipes 28, 30, 32 and 34, vaults 2 can be stacked for storage and use when necessary.

Although storage vault 2 could be buried, one of the primary advantages of vault 2 is that it can be left on top of ground 25. This saves the time and expense of burying the vault and reduces or eliminates the leakage monitoring requirements which exist with buried storage tanks. The use of skids 21 allows quick and convenient visual access beneath lower surface 23 by the user as well as aiding movement of vault 2 (typically when empty) as desired.

Figure 2:
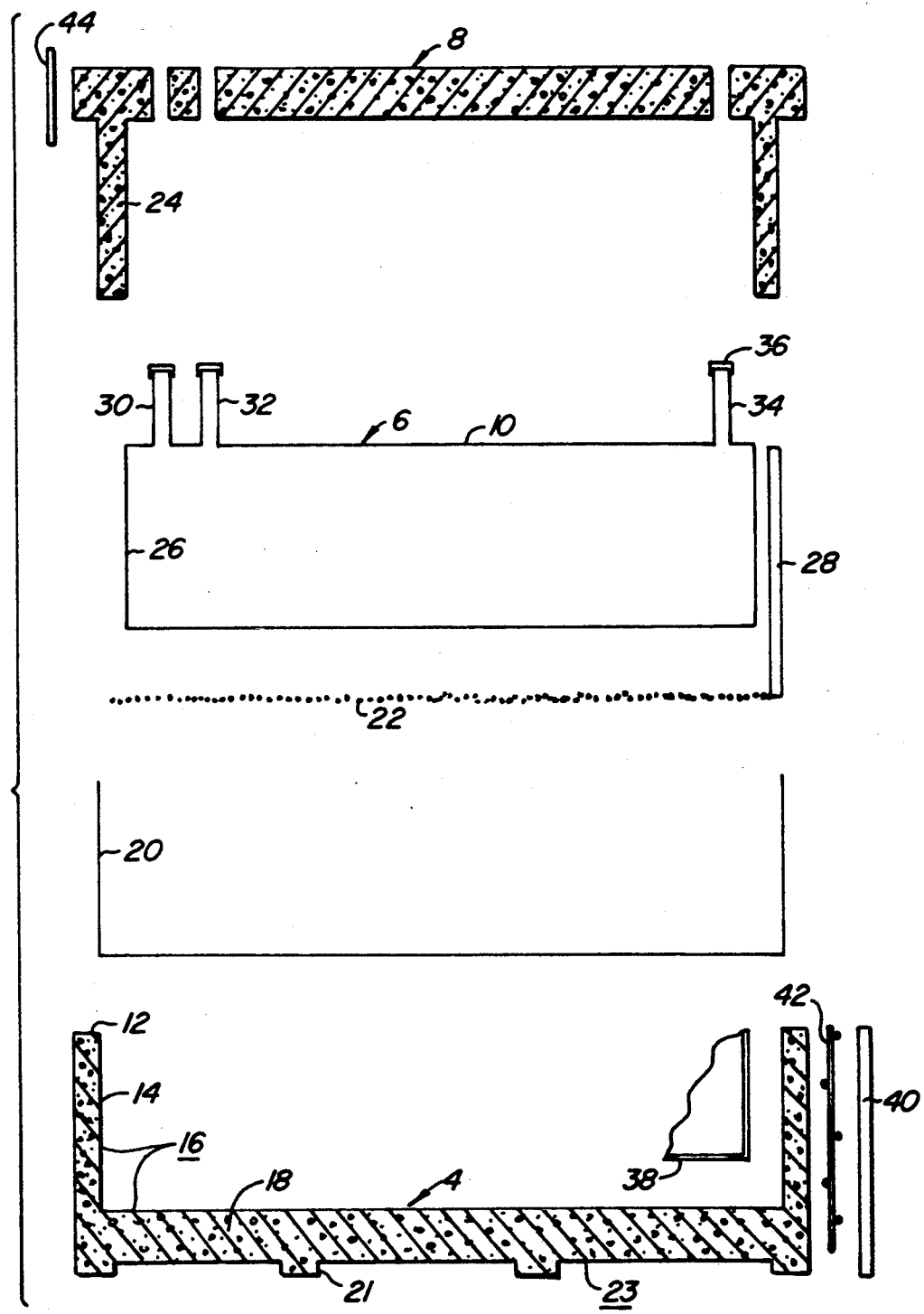
FIG. 2 is an exploded conceptual view illustrating the steps for manufacture of the storage vault of FIG. 1.

The preferred method of manufacture of vault 2 proceeds generally as suggested in FIG. 2. Outer tank 4 is manufactured in a conventional manner by erecting a form having inner and outer portions 38, 40. Inner portion 38 of the form creates the inner surface 16 of tank 4. Reinforcing bars 42 are positioned between the inner and outer form portions, also in a conventional manner, after which concrete is poured into the region between the forms.

After curing, the forms are removed and two coats of a liquid epoxy sealant are applied to surface 16 to form epoxy coating 20. Liquid/vapor collection layer 22 is then positioned on the portion of epoxy coating 20 covering bottom 18.

Coating 20 acts as the secondary containment vessel. Other materials, in either solid or liquid form, could be used to form the secondary containment vessel. For example, a substantially rigid, freestanding shell or a flexible membrane shaped to lie against inner surface 16 could be used as the secondary containment vessel.

Steel inner tank 6 is then positioned within outer tank 4 and placed on the pea gravel making up layer 22 Leak detector pipe 28, and any suitable sensors (not shown), are positioned either before or after positioning inner tank 6 within outer tank 4. A supplemental form 44 is mounted to the upper, circumferential edge 12 of outer tank 4. Concrete layer 24 and concrete cap 6 are poured simultaneously. In this way cap 6 covers both circumferential edge 2 and top 10. After during supplemental form 40 is removed. If desired side walls 14 can be made sufficiently high to eliminate the need for supplemental form 40.

Completed storage vault 2 can be easily loaded onto a suitable vehicle due to the use of skids 21 which raise bottom 18 off of ground 25. For example, a storage vault 2 made using a 500-gallon capacity inner steel tank 6 of no. 10 steel and six inches of reinforced concrete surrounding inner tank 6 weighs about 12,000 pounds empty. It is expected that storage vaults 2 could be made to be transportable with a maximum capacity of about 1,000 gallons (empty weight about 17,000 pounds) based upon realistic size and weight limitations. Using four inches of lightweight concrete, instead of six inches of standard concrete, would reduce the weight by about 40% to 50%.

Figure 3:
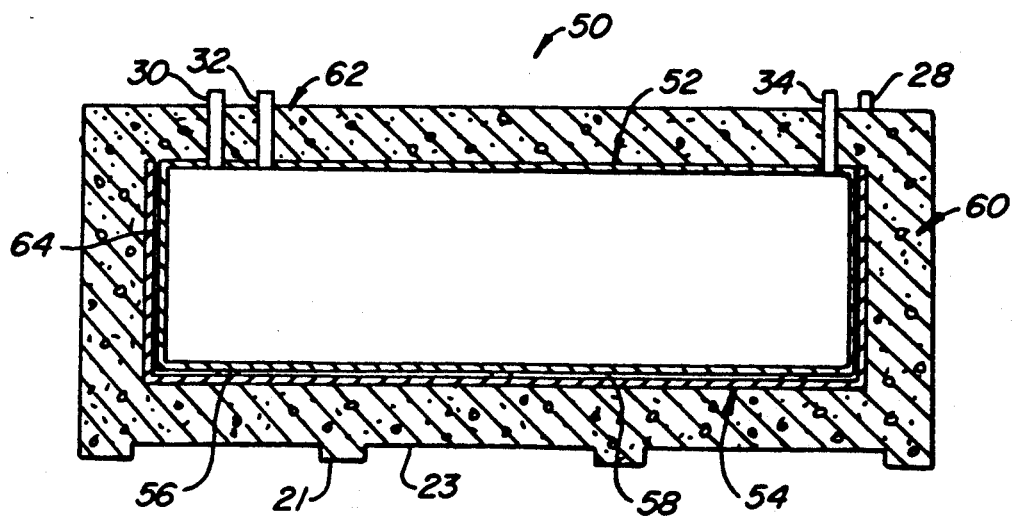
FIG. 3 is a cross-sectional view of an alternative embodiment of the storage vault of FIG. 1.

Referring now to FIG. 3, an alternative embodiment of storage vault to FIG. 1 is shown. Storage vault 50 includes an inner, steel tank 52, acting as a primary containment vessel, positioned within a steel shell 54, acting as the secondary containment vessel. Tank 52 and shell 54 are substantially rigid, freestanding units. Inner tank 52 is supported a short distance above steel shell 54 by spacers 56 to allow the region 58 between tank 52 and shell 54 to be monitored for leaks through leak detector pipe 28. Inner tank 52 and steel shell 54 are both contained within a concrete outer tank 60 and are covered with a concrete top 62. Concrete tank 60 is a reinforced concrete tank. A side spacing 64 between inner tank 52 and steel shell 54 is chosen to permit tank 52 to be inserted within shell 54 and allow test pipe 28 to be positioned between tank 52 and shell 54. The distance the concrete extends into region 64 depends largely upon the width of region 64.

Storage vault 50 has an advantage over storage vault 2 in that vault 50 is more suited for high volume production. Vault 50 is made by constructing inner tank 52 and shell 54, and then positioning tank 52 on spacers 56 within shell 54 with detection pipe 28 therebetween. Finally, everything is encased with concrete in a single pour.

Modification and variation can be made to the disclosed embodiments without departing from the subject of the invention as defined in the following claims. For example, non-flammable liquids can be stored in vault 2 if desired. In the preferred embodiment concrete cap 8 and concrete layer 24 do not have reinforcing members embedded in them. If desired, reinforcing members could be used in these elements. Inner tank needs not be made of steel: other materials may be suitable according to the particular requirements of the material being contained. Skids 21 are preferably integral extensions of bottom 18 of outer tank 4. However, skids 21 could be separately made and secured to bottom 18. Also, although not preferred, skids 21 could be omitted from vault 2. This would require, for best advantage of the invention, that skids be used at least at the point of use to keep bottom 18 from ground 25 to allow visual inspection beneath vault 2. Gravel layer 23 could be replaced by other open support or spacer members. Inner tank 6 could be cylindrical instead of rectangular. If cylindrical tank 6 would still be covered with the required thickness of concrete. The outer concrete tank 4 could be rectangular or cylindrical if the vault is to be stored on its flat end (the axis of the inner tank vertical). If such storage vault is to be stored on its side (the axis of the inner tank horizontal). saddles would be required to support the inner tank to achieve the desired stability.

I claim:

1. A method for the above-ground storage of a flammable, potentially ground water polluting liquid on a support surface comprising the following steps:
   providing an inner tank configured to contain the flammable liquid;
   encasing the inner tank within a layer of concrete to create a dual walled container;
   supporting the dual walled container a chosen distance above the support surface to create a visual leak inspecting region between the dual walled container and the support surface;
   containing the flammable liquid within the inner tank;
   checking for leaks of said fluid by performing at least first and second separate checking steps, said first checking step comprising monitoring a region between said inner tank and said layer of concrete for leakages said region being spaced from said visual leak inspection region, and said second checking step comprising;
   inspecting said inspection region between the dual walled container and the support surface for leakage of the flammable liquid.

2. The method of claim 1 wherein the containing step is carried out by containing the flammable liquid within a steel inner tank.

3. The method of claim 1 wherein the encasing step includes the step of containing the inner tank within an outer liquid barrier between the concrete layer and the inner tank to create a fluid collection region between the inner tank and the outer liquid barrier.

4. The method of claim 3 further comprising the step of providing access to the fluid collection region to monitor for leaks into the fluid collection region.

5. A method for detecting leakage of a stored fluid, comprising:
   selecting a dual walled container having an inner tank encased within a layer of concrete;
   positioning said container in a first location;
   transporting said container to a second location, different from said first location, without disassembling said container;
   elevating said container at least a first distance above a support surface at said second location to form a first region between said container and said support surface;
   placing said fluid within the inner tank of said container;
   checking for leaks of said fluid by performing at least first and second separate checking steps, said first checking step comprising monitoring a second region between said inner tank and said layer of concrete for leakages said second region being spaced from said first region, and said second checking step comprising inspecting said first region for leakage of said fluid.

6. A method for detecting leakage of a stored fluid, comprising:
   selecting a dual walled container having an inner tank encased within a layer of concrete;
   positioning a sheet of plastic on a support surface;
   elevating said container at least a first distance above a support surface in the region of said sheet of plastic to form a first region between said container and said sheet of plastic;
   placing said fluid within the inner tank of said container;
   checking for leaks of said fluid by performing at least first and second separate checking steps, said first checking step comprising monitoring a second region between said inner tank and said layer of concrete for leakages said second region being spaced from said first region, and said second checking step comprising inspecting said first region for leakage of said fluid.

7. A method for forming a dual-containment tank comprising:
   casting a concrete tank having a bottom and sidewalls;
   covering the inner surface of the concrete outer tank with an epoxy resin;
   placing a layer of gravel over the epoxy resin covering the bottom of the outer tank;
   placing a substantially sealed inner tank over the gravel layer to form a first space between the inner tank and the inner walls of the outer tank;
   substantially simultaneously filling said first space with concrete and pouring a concrete cap over the top of said inner tank.

* * * * *

UNITED STATES PATENT AND TRADEMARK OFFICE
CERTIFICATE OF CORRECTION

PATENT NO. : 5,157,888
DATED : October 27, 1992
INVENTOR(S) : Lindquist It is certified that error appears in the above-identified patent and that said Letters Patent is hereby corrected as shown below:

On the title page, under "Related U.S. Application Data", item [63], delete "-in-part".

At column 5, line 45, change "inspecting" to --inspection--.

Signed and Sealed this

Twenty-third Day of November, 1993

Attest:

BRUCE LEHMAN

Attesting Officer   Commissioner of Patents and Trademarks